United States Patent [19]

Nini et al.

[11] Patent Number: 5,094,419
[45] Date of Patent: Mar. 10, 1992

[54] LIFT BAR FOR POWER SEAT ADJUSTER

[75] Inventors: James P. Nini; Thomas B. Blake, both of Mt. Clemens, Mich.

[73] Assignee: General Motors Corporation, Detroit, Mich.

[21] Appl. No.: 646,308

[22] Filed: Jan. 28, 1991

[51] Int. Cl.⁵ ............................................. A45D 19/04
[52] U.S. Cl. .................................... 248/394; 248/157; 248/422
[58] Field of Search ................ 248/157, 393, 394, 395, 248/396, 398, 424, 421, 422; 297/328, 330, 325, 346

[56] References Cited

U.S. PATENT DOCUMENTS

| 1,275,855 | 8/1918 | Copping | 74/89.15 X |
|---|---|---|---|
| 3,123,333 | 3/1964 | Rose | 248/394 |
| 3,420,482 | 1/1969 | Taylor | 248/222.3 X |
| 4,190,221 | 2/1980 | Updike | 248/225.1 X |
| 4,310,193 | 1/1982 | Kolleas | 248/225.1 X |
| 4,530,481 | 7/1985 | Kluting | 248/224 X |
| 4,765,582 | 8/1988 | Babbs | 297/346 X |
| 4,807,947 | 2/1989 | Nuzzo | 248/222.3 X |
| 4,850,561 | 7/1989 | Pipon | 248/421 |
| 4,871,137 | 10/1989 | Ikegaya | 248/396 |

Primary Examiner—J. Franklin Foss
Attorney, Agent, or Firm—Edward J. Biskup

[57] ABSTRACT

A power seat adjuster which allows a seat to be adjusted to a desired elevation and pitch replaces a lift plate of a lift assembly with a lift bar. The lift bar is slid into grooves on an upper channel of a top plate, and the top plate is connected to a rigid link. Jack screws with shafts that have a nonround portion are provided to take up torque and keep the lift bars from binding with the top plate so that there is no interference in the operation of the power seat adjuster.

6 Claims, 2 Drawing Sheets

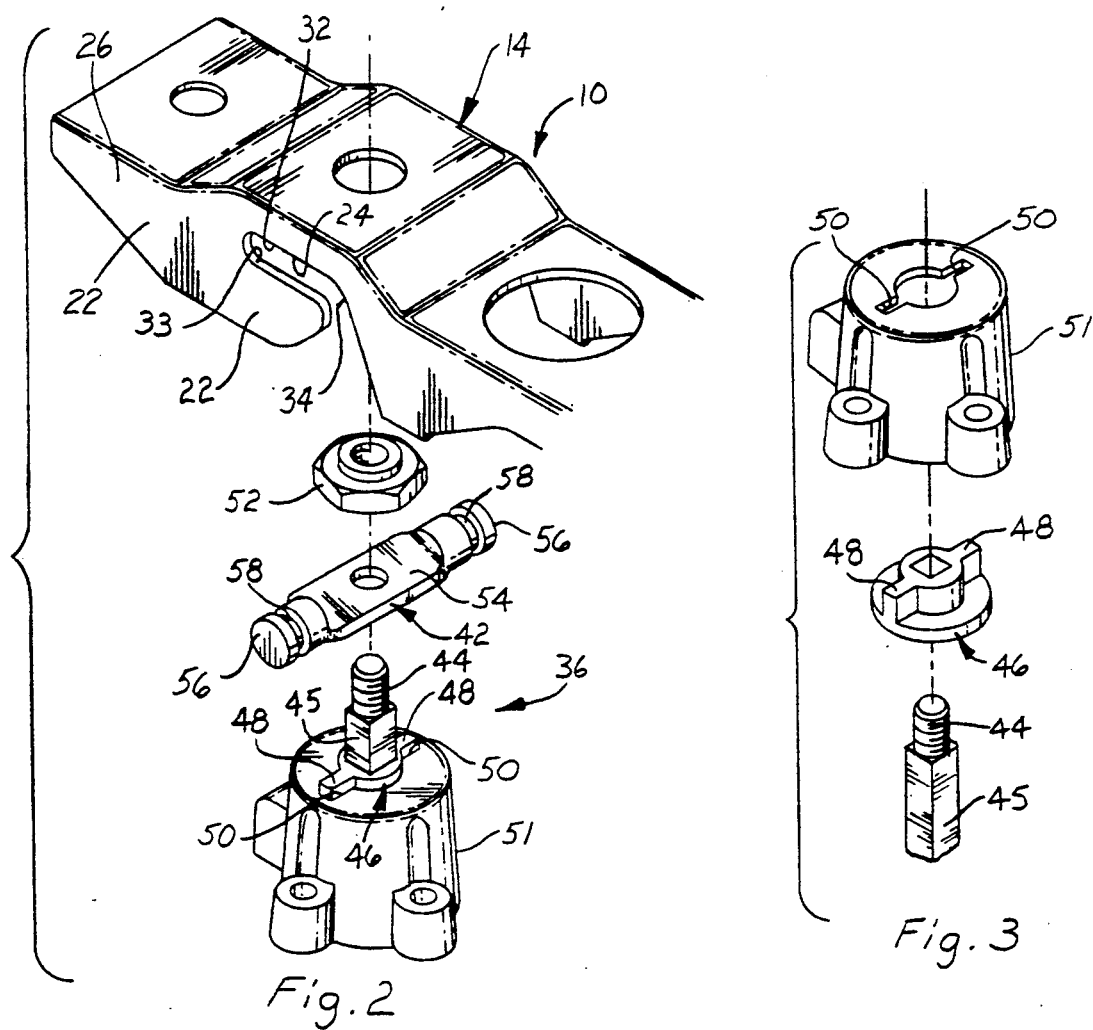
Fig. 2
Fig. 3
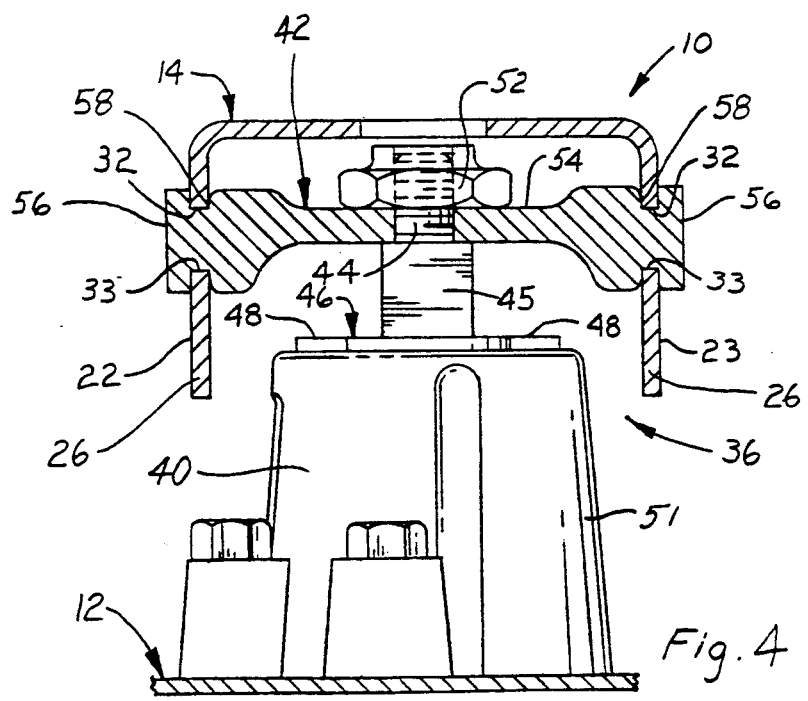
Fig. 4

LIFT BAR FOR POWER SEAT ADJUSTER

BACKGROUND OF THE INVENTION

This invention relates generally to seat adjusters and more specifically to powered seat adjusters which allow a seat to be adjusted to a desired elevation and pitch.

It is known in the art to provide power seat adjusters for a vehicle seat where the forward end elevation or the rearward end elevation of the seat may be set independently. An example of a typical seat adjuster is shown in U.S. Pat. No. 4,664,351 issued to Hans Borlinghaus on May 12, 1987.

The Borlinghaus patent discloses a seat adjuster assembly that has two adjusters, each of which has a floor plate, sometimes referred to as an upper channel, slidably carried on a lower channel for forward and rearward movement within the vehicle. The adjuster also has a top plate which is generally parallel with the floor plate. To add support, the top plate and floor plate are connected by a rigid link pivotally connected to the top plate and floor plate along opposite ends of the rigid link. Also provided at the forward end and rearward end of the floor plate are a forward lift assembly and a rearward lift assembly, respectively, to allow adjustment of the seat elevation and pitch. The forward lift assembly and the rearward lift assembly each include a nonrotating jack screw which is raised and lowered by a powered gearing system. The forward lift assembly and the rearward lift assembly also each have a lift plate, or lift bracket, fixably connected to the top of each of the respective jack screws. The lift plate is a substantially thin elongated member which fits into a thin elongated fore and aft slot of the top plate. The lift plate is retained on the top plate by a nut and washer combination. To adjust the seat, the forward lift assembly or the rearward lift assembly is selectively raised or lowered. The connecting rigid link, which has a fixed rotational axis with the top plate and the floor plate, pivots with a fixed arc. Therefore, either the lift assembly connection to the top plate or the rigid link must provide for sliding movement as well as pivotal motion.

The Borlinghaus patent is directed to an operational problem experienced by many seat adjusters wherein, at the end of travel in the upward or downward direction, the jack screw will be urged to rotate slightly even though it is retained by the overlap of the top plate with the lift plate. This overlap of the top plate and the lift plate will have a slight clearance and the lift plate at the end of the travel of the jack screw will be slightly rotated into an interference position with the top plate. This interference will cause intermittent freezing of the parts thereby giving the seat an uneven and jerking vertical motion. Although the intermittent freezing and jerking free motion is not critical in the functional operation of the seat adjuster, it will sometimes cause the seat to have an unstable feeling to the occupant.

The Borlinghaus patent solves this problem by having the lift plate torsionally stabilized to prevent the lift plate from aligning itself into an interference relationship with the top plate or other members of the seat adjuster. This is achieved by a fork and tongue, or sliding finger, interlock of the top plate with the lift plate and with an oblong hole in the lift plate to connect with a jack screw. It can also be achieved with an interlock of the rigid link with the lift plate as well as the oblong hole in the lift plate. However, in each instance, the positioning of the Borlinghaus lift plate adds additional manufacturing complexity to an already complex assembly. For example, each lift plate requires two riveting operations to attach the lift plate to the top plate, as well as two riveting operations to attach the rigid link, for a total of six riveting operations for each seat adjuster assembly and twelve for each seat assembly, since each seat assembly includes two seat adjuster assemblies.

SUMMARY OF THE INVENTION

An object of the present invention is to provide a new and improved power seat adjuster which allows a seat to be adjusted to a desired elevation and pitch that is simple and easy to manufacture.

Another object of the present invention is to provide a new and improved power seat adjuster which allows a seat to be adjusted to a desired elevation and pitch that reduces the number of riveting operations needed for assembly.

Yet another object of the present invention is to provide a new and improved power seat adjuster which allows a seat to be adjusted to a desired elevation and pitch that provides smooth operation and does not have a jerking motion.

The present invention meets the above described objects by providing a new and improved power seat adjuster which allows a seat to be adjusted to a desired elevation and pitch. The power seat adjuster comprises a lower channel which is attached to a vehicle floor. A floor plate is slidably carried on the lower channel and is able to move fore and aft relative to the lower channel. A rigid link is pivotally connected to the floor plate along a lower end of the rigid link and a top plate is pivotally connected to the rigid link along an upper end of the rigid link. The top plate is attached to a vehicle seat and is channel shaped and has a pair of parallel channel walls. A pair of grooves are formed in a forward section of the channel walls and a pair of identical grooves are formed in a rear section of the channel walls in the top plate. A front lift assembly and a rear lift assembly are fixedly attached to the floor plate and are interconnected with the grooves found in the forward section and the rear section, respectively, of the top plate. Each lift assembly includes a jack screw fixedly attached to the floor plate and a lift bar attached to the jack screw by a nut tightened onto a square threaded shaft on the jack screw. The lift bar is made from rolled stock and has a flattened middle section. The lift bar has a pair of rounded flanged ends which slidably engage the associated grooves of the channel walls of the top plate. The threaded shaft in conjunction with a stop member reduces the amount of torque transmitted to the lift bar.

Other objects and features of the invention will become apparent to those skilled in the art as disclosure is made in the following detailed description of a preferred embodiment of the invention which sets forth the best mode of the invention contemplated by the inventors and which is illustrated in the accompanying sheets of drawing.

BRIEF DESCRIPTION OF THE DRAWINGS

FIG. 2 is an exploded perspective view of a lift assembly of the present invention showing a lift bar;

FIG. 3 is an exploded perspective view of a jack screw of the present invention showing the threaded shaft and the stop member; and FIG. 4 is a sectional view of the powered seat adjuster of the present invention taken along line 4—4 of FIG. 1.

DETAILED DESCRIPTION OF THE PREFERRED EMBODIMENT

Figure 1:
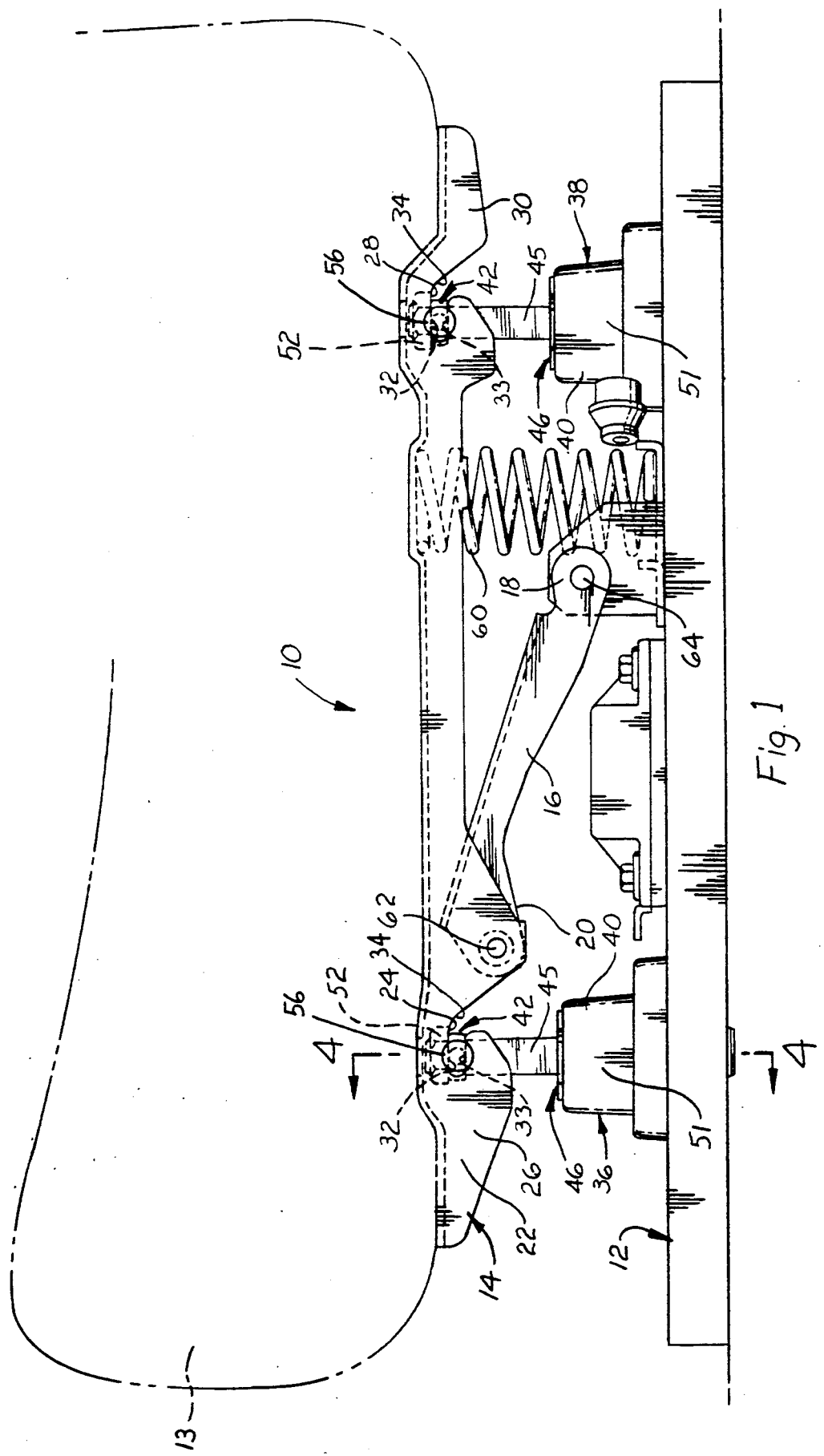
FIG. 1 is a side view of the powered seat adjuster of the present invention.

Referring to FIGS. 1 and 2, a seat adjuster assembly 10 is shown. The seat adjuster assembly 10 comprises a lower channel (not shown) which is fixedly attached to a floor of a vehicle. A floor plate 12 is slidably carried on the lower channel by a bearing assembly, and the floor plate 12 is able to move fore and aft relative to the lower channel. A top plate 14, which is generally parallel to the floor plate 12 and upon which a vehicle seat 13 is carried, is also provided. Connecting the floor plate 12 with the top plate 14 is a rigid link 16. The rigid link 16 is pivotally connected to the floor plate 12 at a lower end 18 and is pivotally connected to the top plate 14 at an upper end 20, and has a fixed axis of rotation between the floor plate 12 and the top plate 14.

The top plate 14 is channel shaped and, as seen in FIG. 4, has a pair of parallel channel walls 22 and 23. As seen in FIG. 1, a pair of laterally aligned grooves 24 are formed in a forward section 26 of the channel walls 22 and 23 and a pair of identical grooves 28 are formed in a rearward section 30 of the channel walls 22 and 23 of the top plate 14. Each groove 24 and 28 is defined by vertically spaced engagement wall portions 32 and 33 which are substantially parallel to the longitudinal axis of the top plate 14 and an included entrance wall portion 34 which allows access to the engagement wall portions 32 and 33.

To vertically adjust the seat there is provided a front lift assembly 36 and a rear lift assembly 38, both of which are connected to the floor plate 12. The front lift assembly 36 and the rear lift assembly 38 are identical and include a nonrotational jack screw 40 and a lift bar 42. As best seen in FIG. 2, an upper end of the jack screw 40 has a threaded shaft 44 portion integral with a square portion 45 which passes thorough a square hole of a stop member 46. Even though the square portion 45 is formed in the threaded shaft 44 and the square hole is formed in the stop member 46, it will become apparent as the description of the invention proceeds that any nonround shaft fitting though a like nonround hole may be used. The stop member 46 has a pair of diametrically opposed flanges 48 which fit into a corresponding pair of keyed slots 50 formed in a housing 51 of the jackscrew 40, as seen in FIG. 3. The lift bar 42 is secured to the jack screw 40 by a nut 52 tightened onto the threaded shaft portion 44 of the jack screw 40, as shown in FIG. 2. It should be noted that except for the use of the stop member 46 and the square portion 45 the jack screw 40 is the same in construction and operation as the jack screws in the above mentioned Borlinghaus patent. The stop member 46-square portion 45 arrangement serves to prevent any torque from the operation of the jack screw from being transmitted to the lift bar 42 by having the torque be taken up by the square portion 45 of the threaded shaft 44 and the stop member 46 and be transferred through the housing 51 to the floor plate 12. The lift bar 42 is made from rolled stock and has a flattened middle section 54. The lift bar 42 also has a pair of opposed rounded flanged ends 56, each of which is formed with an annular groove 58 which slidably engages and receives the associated engagement wall portions 32 and 33 of the grooves 24 of the channel walls 22 and 23 and carries the forward section 26 of the top plate 14.

A coil spring 60 is fixedly attached to the floor plate 12 at a lower end and to the top plate 14 at an upper end opposite the lower end. The coil spring 60 provides an upward spring force that counteracts any downward force on the seat adjuster due to an occupant being in the seat. The upward spring force allows the front lift assembly 36 and the rear lift assembly 38 to move the top plate 14 without having to provide all of the upward force needed to raise the seat.

In operation, the seat 13 is supported by the top plate 14, and the top plate 14 is held aloft by the front lift assembly 36 and the rearward lift assembly 38 which are fixedly attached to the floor plate 12, as mentioned above. The rigid link 16 maintains the top plate 14 parallel, from a top view, to the floor plate 12, and counteracts any torque which would tend to shift or twist the top plate 14 from side to side to insure that there is no yaw. To adjust either the height or the pitch of the seat, the occupant actuates either, or both, the front lift assembly 36 or the rear lift assembly 38. Since the rigid link 16 has a fixed length, the rigid link 16 acts as a constant radius as the seat is raised and the rigid link 16 swings through an arc. This causes the top plate 14 to move in a rearward direction in relation to the floor plate 12 as the seat and the top plate are raised. This is allowed to happen as the lift bars 42 of the front lift assembly 36 and a rear lift assembly 38 are able to slide in the pairs of grooves 24 and 28, respectively.

The present invention does not exhibit the operational difficulty of interference of the top plate and a lift plate causing intermittent freezing of the parts. The torque that caused this problem and was taken up by a fork and tongue interlock of the lift plate and the top plate in the Borlinghaus patent is taken up by the front and rear lift assemblies 36 and 38, respectively, and more particularly by the square portion 45 of the threaded shaft 44 and the stop member 46 of the front and rear lift assemblies 36 and 38, respectively.

Even though the present invention and the invention disclosed by the Borlinghaus patent both perform the same function, assembly of the present invention is improved as compared to the Borlinghaus patent. In Borlinghaus, each lift plate had to be riveted to the top plate by two rivets. A rigid link was then riveted into place by an additional two rivets. This made six riveting operations for each seat adjuster assembly and twelve riveting operations for each seat assembly, since each seat assembly includes two seat adjuster assemblies. The present invention greatly simplifies assembly by eliminating eight of the Borlinghaus riveting operations. In the present invention, the top plate is slid into place on the lift bars 42 of the front and rear lift assemblies 36 and 38, respectively through the entrance wall portion 34 so that the engagement wall portions 32 and 33 are engaged. Then the rigid link 16 is riveted into place with two rivets 62 and 64, each of which serves as a pivotal connection, so for the seat adjuster assembly 10 portion of the seat assembly only four riveting operations are required. This simplifies the assembly of the seat and lowers the expense for manufacturing and assembling the vehicle.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A seat adjuster comprising:
   a floor plate;
   a rigid link having a lower end and an upper end;
   the rigid link pivotally connected with the floor plate along the rigid link's lower end;
   a top plate pivotally connected with the rigid link along the rigid link's upper end, the top plate being channel shaped and having channel walls;
   the channel wall having grooves formed therein adjacent a forward section and a rearward section of the top plate;
   the grooves being defined by vertically spaced engagement wall portions;
   the grooves including entrance wall portions which allow access to the engagement wall portions;
   a lift assembly fixedly connected to the floor plate at the forward section and the rearward section of the top plate;
   each lift assembly including a jack screw fixedly connected to a lift bar by a threaded shaft and a nut;
   the threaded shaft having a nonround portion;
   the nonround portion of the threaded shaft fitting through a nonround hole of a stop member to reduce the torque transmitted to the lift bar;
   the lift bar having a shaft with a flattened middle section; and
   the shaft having a pair of flanged ends which slidably engage the engagement wall portions of the grooves and carry the top plate.

2. The seat adjuster as set forth in claim 1 wherein the stop member has a plurality of flanges;
   a housing of the jack screw having keyed slots; and
   the plurality flanges fitting into the keyed slots.

3. The seat adjuster as set forth in claim 2 wherein the plurality of flanges comprise a pair of diametrically opposed flanges.

4. The seat adjuster as set forth in claim 2 wherein the nonround portion is a square portion;
   the nonround hole of the stop member is a square hole.

5. The seat adjuster as set forth in claim 1 wherein a coil spring is fixedly attached to the floor plate at a lower end; and
   the coil spring being fixedly attached to the top plate at an upper end opposite the lower end.

6. A seat adjuster comprising:
   a floor plate;
   a rigid link having a lower end and an upper the rigid link pivotally connected with the floor plate along the rigid link's lower end;
   a top plate pivotally connected with the rigid link along the rigid link's upper end, the top plate being channel shaped and having channel walls;
   the channel wall having grooves formed therein adjacent a forward section and a rearward section of the top plate;
   the grooves being defined by vertically spaced engagement wall portions;
   the grooves including entrance wall portions which allow access to the engagement wall portions;
   a lift assembly fixedly connected to the floor plate at the forward section and the rearward section of the top plate;
   each lift assembly including a jack screw fixedly connected to a lift bar by a threaded shaft and a nut;
   the threaded shaft having a square portion;
   the square portion of the threaded shaft fitting through a square hole of a stop member;
   the stop member having a pair of diametrically opposed flanges;
   a housing of each jack screw having keyed slots;
   the flanges fitting into the keyed slots to reduce the torque transmitted to the lift bar;
   the lift bar having a shaft with a flattened middle section;
   the shaft having a pair of flanged ends which slidably engage the engagement wall portions of the grooves and carry the top plate;
   a coil spring being fixedly attached to the floor plate at a lower end; and
   the coil spring being fixedly attached to the top plate at an upper end opposite the lower end.

* * * * *